UNITED STATES PATENT OFFICE 2,277,125

PREPARATION OF POLYAMIDES

Elmore Louis Martin, Wilmington, Del., assignor to E. I. du Pont de Nemours & Company, Wilmington, Del., a corporation of Delaware No Drawing. Application October 5, 1939, Serial No. 298,140

7 Claims. (Cl. 260—78)

This invention relates to polymeric materials and more particularly to the preparation of linear polyamides.

Polyamides have been prepared previously by the polymerization of a monoaminomonocarboxylic acid, or by reacting a diamine with a chemically equivalent amount of dibasic carboxylic acid. The high molecular weight of fiber-forming polyamides of these types, the production of which is the most valuable application of the process of this invention, are described in United States Patents 2,071,253, 2,130,523 and 2,130,948. It is known that amide-forming derivatives, (esters, acid halides, anhydrides, and amides) of the dibasic acids or of the amino acids, could be used instead of the dibasic acids or amino acids. But no specific derivatives of the amino reactants, e. g., the diamines or the amino group of the amino acids, have been heretofore suggested.

This invention has as an object a new method for preparing polyamides. A further object is a new method for making linear polyamides which can be formed into valuable synthetic fibers. Other objects will appear hereinafter.

These objects are accomplished by heating at amide-forming temperatures a polyamide-forming composition comprising a reactant which contains at least one formylamino group. The polyamide-forming compositions may consist of the N-formyl derivative of a polymerizable monoaminomonocarboxylic acid or amide-forming derivative thereof or substantially equimolecular proportions of the N-formyl or N,N'-diformyl derivative of a diprimary or di-secondary diamine and a dibasic carboxylic acid or amide-forming derivative thereof.

I have discovered that polyamides of the kind described in the previously mentioned patents are readily obtained in the manner above indicated from a reactant or reactants having a formylamino group and that the reaction is specific and peculiar to the formyl derivatives in that the acetyl and other acyl derivatives are inoperative for the purposes of this invention.

The preferred method of carrying out the invention consists in reacting with a dibasic carboxylic acid or its amide-forming derivative substantially chemically equivalent quantities of a N,N'-diformyl derivative of a diprimary diamine at polymerizing temperatures, e. g. 200 to 300° C., and under conditions permitting the by-product, e. g. formic acid, to escape. In a similar manner, the polyamides are prepared by heat treatment of the N-formyl derivatives of a monoaminomonocarboxylic acid. In its preferred embodiment the polymerization reaction is continued until the polymer exhibits fiber-forming properties. The optimum time and temperature are determined in part by the nature of the reactants, in part by the melting point of the resultant polymer, and in part by the size of the batch. In general, the polymerization is carried out at a temperature slightly above the melting point of the resultant polymer.

The necessary conditions for the preparation of fiber-forming polymers vary according to the particular case, but in practice the conversion to a fiber-forming polymer is easily tested by merely touching the surface of the molten polymer with a rod and withdrawing the rod. If the fiber-forming stage is reached, a continuous filament of considerable strength and pliability is obtained readily. The degree of polymerization also may be followed by determining the intrinsic viscosity of a solution of the polymer in meta-cresol as described in Patent 2,130,948. The fiber-forming stage is reached when the polymer has an intrinsic viscosity of about 0.4. If products capable of being formed into fibers of optimum quality are to be obtained, it is desirable to prolong the heat treatment beyond that point where the intrinsic viscosity has become 0.4. In general polyamides having an intrinsic viscosity between 0.6 and 2.0 are most useful for the preparation of fibers. The heat treatment necessary to produce products qualified for spinning into filaments must be determined for each polymer as inferior products result if the heat treatment is continued over periods of too long or too short duration.

It is desirable, particularly for the production of fiber-forming polyamides, that the formyl derivative of the diamine have a radical length of at least 6, the dibasic carboxylic acid a radical length of at least 5, and the amino acid a radical length of at least 7, the term "radical length" being defined as in Patent 2,130,948.

The following examples, in which quantities of reactants are parts by weight illustrate in greater detail the processes of this invention.

Example I

A mixture of 8.60 parts of the N,N'-diformyl derivative of hexamethylenediamine

M. P. 105–106° C., (prepared by the heat treatment of hexamethylenediammonium diformate. Anal. calculated for $C_8H_{16}O_2N_2$: N. 16.27. Found: N. 16.53.) and 7.30 parts of adipic acid was heated in a reaction vessel into which a slow stream of oxygen-free nitrogen was introduced. The mixture was heated at atmospheric pressure for one hour by means of the vapors of boiling diphenyl (B. P. 255° C.), for one hour by means of the vapors of boiling diphenylene oxide (B. P. 287° C.), and finally for 0.1 hour at the latter temperature at 10 mm. pressure (absolute). The by-products of the reaction which include formic acid, water and carbon monoxide, escape from the reaction mixture during the heating. The polymer (polyhexamethylene adipamide) thus obtained was a hard, opaque, solid melting at about 263° C. under oxygen-free conditions, and having an intrinsic viscosity of 0.62. Continuous filaments were obtained by touching the surface of the molten polymer with a rod and withdrawing the rod.

*Example II*

A mixture of 10.41 parts of hexamethylenediammonium formate (prepared by the reaction of one mol of hexamethylenediamine and 2 mols of formic acid in absolute alcohol, M. P. 126–28° C.) and 7.30 parts of adipic acid was heated in the reaction vessel described in Example I for one hour at 255° C. at atmospheric pressure, for 0.6 hour at 287° C. at reduced pressure (10 mm.) and finally for 0.4 hour at 287° C. at atmospheric pressure. The sample of polyhexamethylene adipamide prepared in accordance with the above procedure had an intrinsic viscosity of 0.78.

*Example III*

A mixture of 20 parts of epsilon-aminocaproic acid and 30 parts of formic acid (98–100%) was refluxed gently for two hours, the excess formic acid together with the water of reaction removed by heating on a steam bath under reduced pressure (20 mm.), and then the above process repeated a second time. After freeing of formic acid and cooling, the N-formyl epsilon-aminocaproic acid solidified and after crystallization from alcohol the compound melted at 114–115° C. Anal. calculated for $C_7H_{13}O_3N$: N, 8.81. Found: N, 8.89.

Polymer was prepared by heating 10 parts of N-formyl-epsilon-aminocaproic acid in the reaction vessel described in Example I as follows: At atmospheric pressure for 0.5 hour at 218° C., for 0.5 hour at 255° C., for 1 hour at 287° C., and finally at reduced pressure (20 mm.) for 0.2 hour at 287° C. The epsilon-aminocaproic acid polymer prepared as described above melted at about 210° C., had an intrinsic viscosity of 0.94, and exhibited excellent fiber-forming properties.

*Example IV*

A mixture of 5.163 parts of N,N'-diformyl derivative of hexamethylenediamine and 6.063 parts of sebacic acid was heated in the reaction vessel described in Example I at atmospheric pressure for 3 hours at 255° C. and then for 0.1 hour at 287° C. at 10 mm. pressure (absolute). The polymer (polyhexamethylene sebacamide) melted at about 210° C. and had an intrinsic viscosity of 0.65. Continuous filaments were obtained when the molten polymer was touched with a rod and the rod withdrawn.

*Example V*

A mixture of 4.612 parts of dimethyl sebacate and 3.448 parts of N,N'-diformyl hexamethylenediamine was heated in the reaction vessel described in Example I as follows: at atmospheric pressure for 1 hour at 255° C., for 1 hour at 287° C., at 20 mm. pressure for 1 hour at 287° C., and finally at 2 mm. pressure for 1 hour. The resultant polyhexamethylene sebacamide was a colorless, tough solid which melted at about 210° C., had an intrinsic viscosity of 0.67 and exhibited excellent fiber-forming aptitude.

*Example VI*

A mixture of 18.7 parts of 10-aminocapric acid and 28 parts of formic acid (98–100%) was refluxed gently for 2 hours, the excess formic acid and water of reaction removed by heating on a steam bath under reduced pressure (20 mm.) and the process repeated a second time. Crystallization of the solid residue after removal of the excess formic acid from dilute alcohol yielded glistening crystals which melted at 118–119° C. Anal. calculated for $C_{11}H_{21}O_3N$: N, 6.51. Found: N, 6.79.

The polymer was prepared by heating 7 parts of N-formyl 10-aminocapric acid in the reaction vessel previously described as follows: at atmospheric pressure for 0.5 hour at 255° C., for 0.5 hour at 287° C., and finally for 1 hour at 287° C. under reduced pressure (15 mm.). The 10-aminocapric acid polymer prepared by this procedure melted at about 175° C., had an intrinsic viscosity of 0.82, and exhibited excellent fiber-forming aptitude.

*Example VII*

A mixture of 8.61 parts of decamethylenediamine and 6.9 parts of formic acid (98–100%) was heated in the reaction vessel described in Example I for two hours by means of the vapors of boiling bromobenzene (B. P. 155° C.) and then 10.10 parts of sebacic acid was added and the reaction mixture heated as follows: at atmospheric pressure for 1 hour at 255° C., for 0.5 hour at 287° C., and finally for 1 hour at 20 mm. pressure (absolute). The polydecamethylene sebacamide melted at about 195° C. and had an intrinsic viscosity of 0.88. Continuous filaments were obtained as described in the above examples.

Additional examples of N,N'-diformyl derivatives of diamines which may be used in the process of this invention include the N,N'-diformyl derivatives of such diamines as tetramethylenediamine, pentamethylenediamine, 3-methyl hexamethylenediamine, octamethylenediamine, triglycoldiamine, N,N'-dimethyl hexamethylenediamine, xylylenediamine, 2,11-diaminododecane, and $H_2N-(CH_2)_3-O-(CH_2)_3-NH_2$, metaphenylene diamine, 2,4-toluenediamine, methylene diamine, ethylene diamine, and trimethylenediamine.

Suitable N-formyl derivatives of diamines which may be used are the N-formyl derivative of such diamines as tetramethylenediamine, pentamethylenediamine, hexamethylenediamine and decamethylenediamine.

Other instances of suitable dicarboxylic acids are glutaric acid, beta-methyl adipic acid, pimelic acid, malonic acid, suberic acid, azelaic acid, para-phenylenediacetic acid, isophthalic acid, diglycolic acid, and thio-dibutyric acid

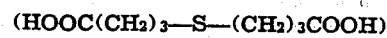
$(HOOC(CH_2)_3-S-(CH_2)_3COOH)$

Further examples of esters which may replace the dicarboxylic acids are diphenyl glutarate, dimethyl adipate, diethyl pimelate, di-n-propyl suberate, dimethyl beta-methyl adipate, dicresyl sebacate, diethyl terephthalate, dimethyl isophthalate, diethyl para-phenylene-diacetate and the diethyl ester of thio-dibutyric acid

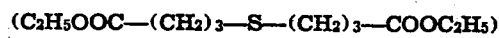

Similarly the anhydrides of the acids may be used.

Likewise a large number of N-formyl derivatives of polymerizable monoaminomonocarboxylic acids may be used in addition to those previously mentioned. Further examples of compounds of this kind are

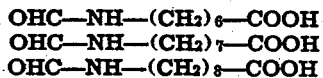

and esters of these acids.

The products of this invention are in some instances advantageously obtained by reacting a mixture of the formyl derivatives of a plurality of different diamines with one or more dibasic acids. The formyl derivative of the diamine may be replaced in part by other linear polymer-forming reactants disclosed in Patent 2,071,250, as for instance glycols.

Although the preferred embodiments comprise heating the reactants until they exhibit fiber-forming properties, it is within the scope of this invention to discontinue the heat treatment before this stage is reached. The low molecular weight or non-fiber-forming polymers are useful for certain applications, as for instance coating compositions.

When a fiber-forming product is desired, the conditions should be such that the by-product of the reaction is permitted to escape. As also indicated in the examples, the reaction may be carried out at atmospheric or subatmospheric pressure. If desired superatmospheric pressure may be used in the early stages of the reaction. The reaction may also be carried out in the presence of an inert solvent for the polymer, preferably a monohydric phenol such as phenol, meta-cresol, and o-hydroxydiphenyl. When the reaction has proceeded far enough to give a polymer of good fiber-forming qualities, the solution may be used directly for spinning, or the polymer may be separated from the solvent by precipitation by the addition of a non-solvent for the polymer such as alcohol or ethyl acetate, or the phenolic solvent may be removed by distillation under reduced pressure. Still another method consists in heating equimolecular proportions of the reactants in the presence of an inert high-boiling hydrocarbon of which white medicinal oil is an example. The same procedures may be applied to the preparation of polyamides from the N-formyl derivatives of mono-aminomonocarboxylic acids.

As was indicated in the examples it is not necessary to isolate and purify the N,N'-diformyl derivative of a diamine before reaction with a dicarboxylic acid. The diamine may be reacted with an excess of formic acid or an amide-forming derivative thereof, e. g., ester under conditions which bring about reaction, i. e., at temperatures of 100–150° C., and then adding the dicarboxylic acid. It is also within the scope of this invention to prepare the diammonium diformate salt of the diamine and to react this compound under conditions which bring about reaction of the diamine and formic acid, i. e. at a temperature of 100–150° C., in the presence of the dicarboxylic acid, followed by heat treatment of the reactants under conditions which bring about reaction of the N,N'-diformyl derivative of the diamine and dicarboxylic acid, i. e., at a temperature of 200–300° C. Similarly, monoaminomonocarboxylic acids can be heated with an excess of formic acid at 100–150° C. and, without isolating the intermediate, the heat treatment can be continued at 200–300° C. for a time sufficient to yield a fiber-forming polymer.

In general no added catalysts are required in the above processes of this invention. However, certain materials such as inorganic materials of alkaline reaction such as oxides and carbonates, acidic materials such as halogen salts of polyvalent metals, e. g., stannous chloride and zinc chloride, and certain neutral salts, e. g., magnesium sulfate, and silica appear in some cases to exercise a certain degree of catalytic activity. Another important class of compounds capable of exerting catalytic activity are strong acids of which phosphoric, sulfuric, borophosphoric, and para-toluenesulfonic acids are examples. Although polyamides compared to most organic compounds are fairly resistant to oxidation, the high temperature required for the preparation causes discoloration in the presence of air and for this reason it is desirable to carry out the reaction in the presence of an inert gas such as nitrogen, hydrogen, or oxygen.

For certain purposes it is desirable that the polyamides be viscosity stable, i. e., do not alter appreciably in viscosity (molecular weight), when heated at their melting points. Viscosity stable polyamides may be prepared by using a small excess (up to 5 mol per cent) of the N,N'-diformyl derivative of the diamine or the dicarboxylic acid reactant or by incorporating into the reaction mixture a small amount, generally 0.1–5.0% of a monoamine or monocarboxylic acid. Polyamides prepared from the N-formyl derivatives of monoaminomonocarboxylic acids are best stabilized by the latter method. Examples of viscosity stabilizers are acetic acid, 2-ethylhexyl-amine, benzoic acid, and propionic acid.

The products of this invention are useful for all the purposes described in the previously mentioned patents.

The present invention makes possible the preparation of polyamides from new and readily obtainable reactants. The N-formyl derivatives for instance are available from tetramethylene- and pentamethylene-diamines by the catalytic hydrogenation of dinitriles in the presence of methyl formate. The present process is also advantageous in connection with the N-formyl derivatives of monoaminomonocarboxylic acids since these derivatives are easily isolated and are readily purified by crystallization.

As many apparently widely different embodiments of this invention may be made without departing from the spirit and scope thereof, it is to be understood that I do not limit myself to the specific embodiments thereof except as defined in the appended claims.

I claim:

1. A process for making polyamides which comprises heating at polymerizing temperatures a linear polycarbonamide-forming composition comprising a bifunctional polycarbonamide-forming reactant containing at least one formyl-amino group.

2. A process for making polyamides which comprises heating at polymerizing temperatures the N-formyl derivative of a diamine having at least one hydrogen atom on each amino nitrogen atom with a complementary polyamide-forming substance of the class consisting of dibasic carboxylic acid and amide-forming derivatives thereof.

3. A process for making polyamides which comprises heating at polymerizing temperatures the N,N'-diformyl derivative of a diamine having at least one hydrogen atom on each amino nitrogen atom with a complementary polyamide-forming substance of the class consisting of dibasic carboxylic acids and amide-forming derivatives thereof.

4. A process for making fiber-forming polyamides which comprises heating at polymerizing temperature the N-formyl derivative of a diamine having at least one hydrogen atom on each amino nitrogen atom with a complementary polyamide-forming substance of the class consisting of a dibasic carboxylic acid and amide-forming derivative thereof, and continuing the heating with removal of the by-products of the reaction until the product obtained is capable of being formed into continuous pliable filaments.

5. A process for making fiber-forming polyamides which comprises heating at polymerizing temperatures the N,N'-diformyl derivative of a diprimary diamine with a complementary polyamide-forming substance of the class consisting of dibasic carboxylic acids and amide-forming derivatives thereof, and continuing the heating with removal of the by-products of the reaction until the product obtained is capable of being formed into continuous pliable filaments.

6. The process set forth in claim 4 in which said formyl derivative has a radical length of at least 6 and said substance has a radical length of at least 5.

7. The process set forth in claim 5 in which said formyl derivative has a radical length of at least 6 and said substance has a radical length of at least 5.

ELMORE LOUIS MARTIN.